No. 696,356. Patented Mar. 25, 1902.
W. H. SMITH.
SEEDER.
(Application filed Apr. 13, 1901.)
(No Model.) 2 Sheets—Sheet 1.
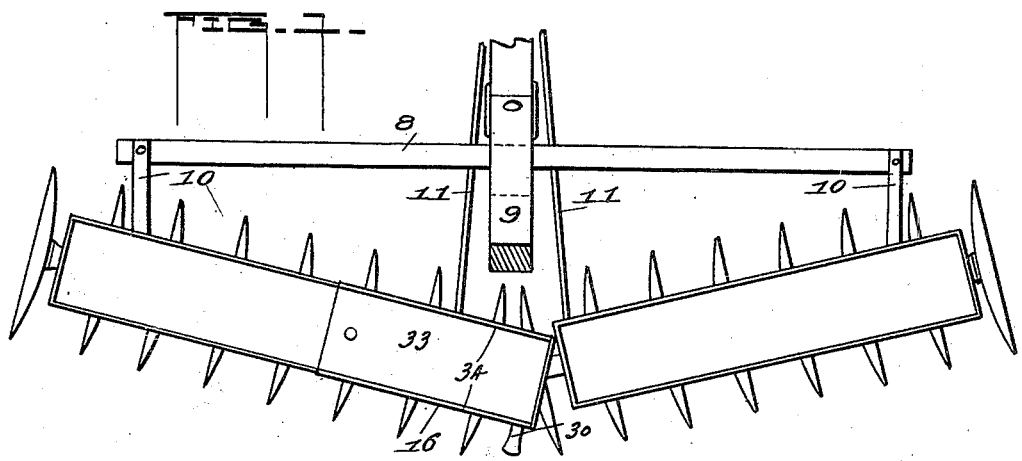
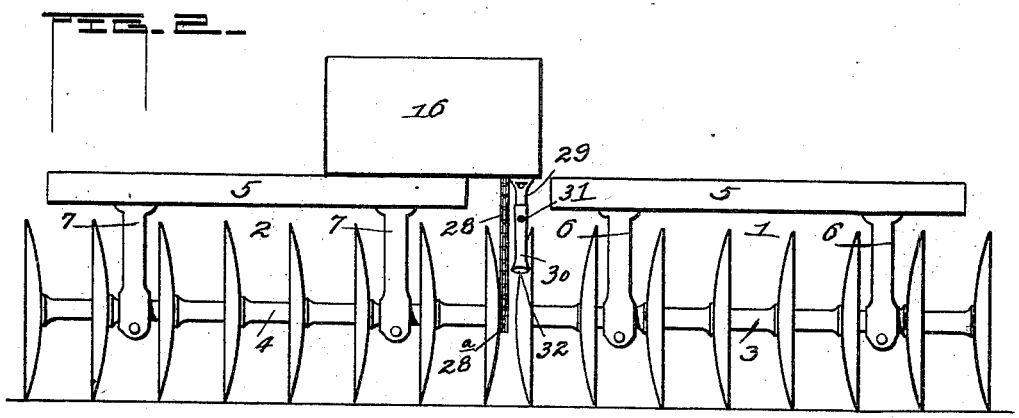
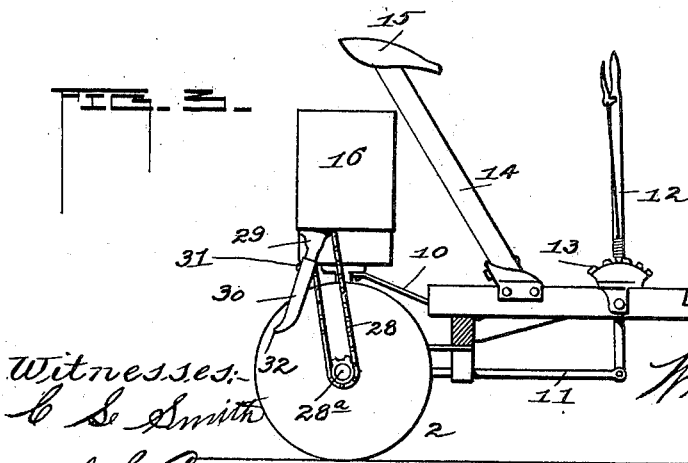
Witnesses:
C. S. Smith
A. B. LaPorte
Inventor.
William H. Smith
By Chs. W. LaPorte
Att'y.
THE NORRIS PETERS CO., PHOTO-LITHO., WASHINGTON, D. C.

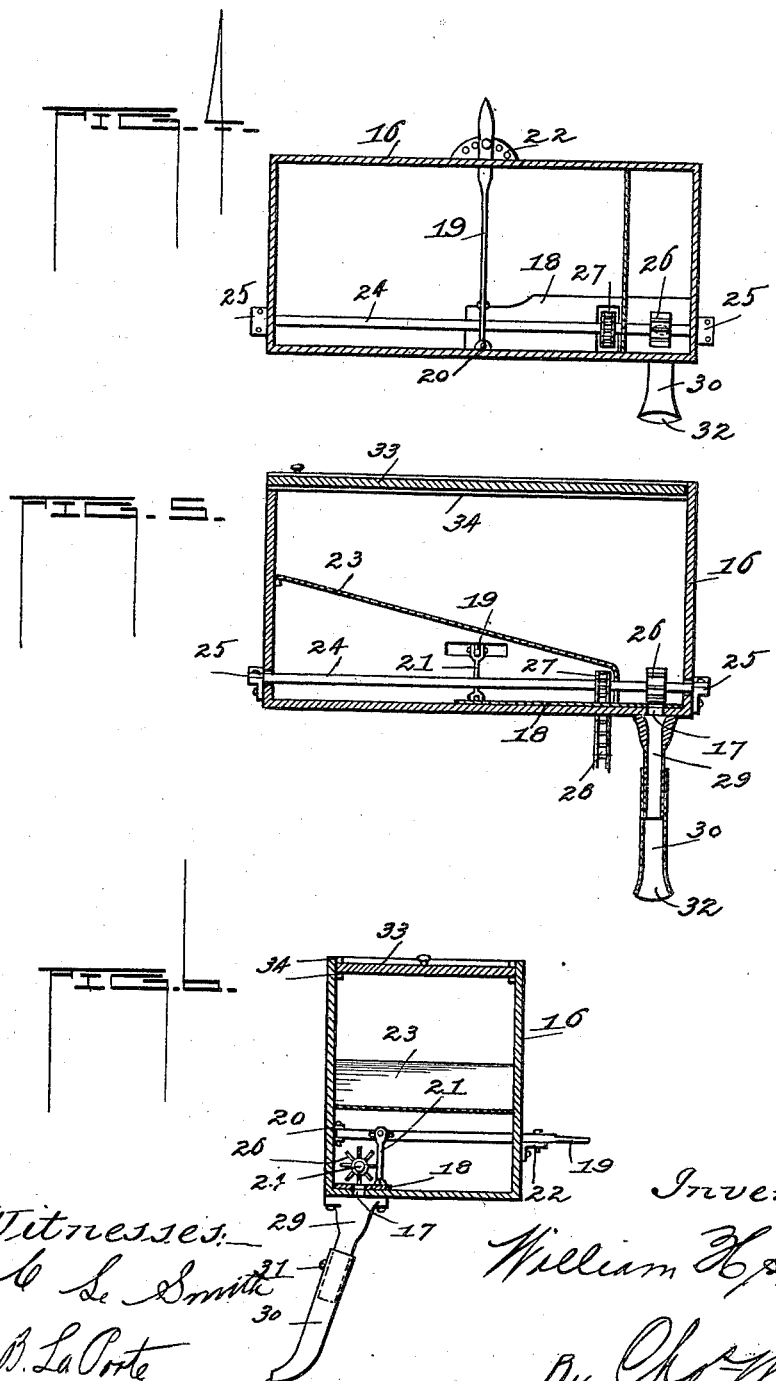

UNITED STATES PATENT OFFICE.

WILLIAM H. SMITH, OF EUREKA, ILLINOIS.

SEEDER.

SPECIFICATION forming part of Letters Patent No. 696,356, dated March 25, 1902.

Application filed April 13, 1901. Serial No. 55,786. (No model.)

*To all whom it may concern:*

Be it known that I, WILLIAM H. SMITH, a citizen of the United States, residing at Eureka, in the county of Woodford and State of Illinois, have invented certain new and useful Improvements in Seeders; and I do hereby declare that the following is a full, clear, and exact description of the invention, which will enable others skilled in the art to which it appertains to make and use the same.

My invention, relates to improvements in seeding devices, and has for its object the provision of a device constructed in a simple and durable manner, and is well adapted for the purpose designed.

More particularly, my invention has reference to a seeding device attached to a disk harrow and suitably supported above the disks and provided with seeding mechanism which will uniformly feed the seed or grain to a delivery-spout, said spout depending from the seeding device and arranged to drop the seed or grain from the seeder to the rear of the traveling disks and in the line of travel or space between the two inner matching right and left disks, and to mechanism for actuating the seeding mechanism, and to other and various details hereinafter set out.

My invention consist, essentially, of a seeding-hopper, arranged to be supported above the right or left hand disks of a disk harrow in such a manner that the valve end of the hopper will extend over the end of the series—that is to say, so that the drop of the seed will be in line directly in the center of the right and left hand series of disks and to the rear of the same; of a telescoping seed or grain spout depending from the seedbox and communicating with a slide or shut-off valve in the bottom of the hopper, and to suitable mechanism for agitating or disturbing the seed or grain in the hopper and to means for actuating the same.

That my invention may be more fully understood, reference is had to the accompanying drawings, in which—

Figure 1 is a plan view of one style of harrow to which my improvements are shown applied. Fig. 2 is a rear elevation of Fig. 1, except that the disks are shown traveling in a straight line. Fig. 3 is an elevation looking in toward the center disk, which may be either of the right or left hand series. Figs. 4, 5, and 6 illustrate in section the seeding-hopper and appliances.

This invention has for its object the distribution of grain or seed by a disk harrow as it travels over the already planted ground to cover the seed. It is well known that in covering grain or seed by a disk harrow that there will be an open space left between the inner matching right and left hand disks in which there will be no seed by reason of the wide angle at which the disks travel and cut furrows, that the inner matching right and left disks will throw the ground in such a manner that there is nearly if not always a ridge of from six to ten or twelve inches between the rows in which there will be little or no grain or seed, and this vacant space in several acres or hundred acres of oats or other seed amounts to a great loss, and it is to overcome this great loss and objection to the disk harrow that I have applied a seeding device to be attached to a harrow to distribute seed or grain, to cover the vacant ridge or space between the disks, and to scatter it just at the rear of the disks.

I have illustrated and will describe one form of disk harrow and the application of a seed-hopper to the same; but it is to be understood that I do not confine myself to any particular form or kind of harrow, nor do I wish to limit myself to the exact detail of device as I have shown, as several forms of hoppers may be used and the same attached in as many different ways as there are styles of machines to attach the same to.

In the drawings, 1 and 2 refer to a right and left hand series of disk harrows having between them extended sleeve portions 3 and 4 and mounted on suitable spindles. In this machine weight-boxes 5 are shown supported on standards 6 and 7, journaled to the sleeves 3 and 4. 8 is the front cross-brace, which supports the tongue 9, and 10 are guides or supports for the brace 8, and 11 are the shifting-rods for throwing the disks, which is accomplished through the lever 12 having connection with the shifting-rods 11, and a pawl to engage the segmental rack 13, supported on the tongue 9. 14 refers to a suitable seat-support or post and has the seat 15 attached thereto. These several features as described and combined form one style of disk harrow, and it is to this machine I am to attach my seeding device, and the same will now be described.

16 refers to a seedbox of suitable size and is supported in a suitable manner above one of the weight-boxes 5 and by the same, so that one end will extend over the inner end of the weight-box, and 17 is a valve-opening in the seedbox, and 18 is a sliding valve-plate with a corresponding opening to the valve-opening 17, and the same lies in the bottom of the box.

19 is a transverse lever extending through the box and pivoted at 20, and depending from the same is a rod 21, which has a sliding pivotal connection with the lever 19, connecting with the valve-plate 18.

22 is a notched or perforated plate lying adjacent to the lever 19, which has a perforation coincident with the notches in the plate, such an arrangement providing that when the lever is shifted the valve-plate will be correspondingly shifted to enlarge or close the valve-port 17 and held in such position by inserting a pin into the perforations of the lever and pass the same through the opening coincident therewith in the notched plate 22.

I have shown a dividing-plate or false bottom 23 in the box lying on an incline therein and having a vertical portion at its inner end, which will insure the seed or grain being fed to the valve-port.

24 is a cross shaft or spindle in the box, and journaled in the boxes 25 and 26 is a suitable agitator carried on the same and is rotated therewith in a concentric line above the valve and valve-port which will feed in a uniform manner the seed or grain to the valve-port.

27 is a pinion carried on the spindle 24 and under the plate or partition 23 and adjacent to the vertical portion thereof and is suitably actuated through the sprocket-chain connection 28 with a pinion 28$^a$, carried on one of the spindles supporting the disks, and it is purposed to locate the pinion on the spindle adjacent to the convex surface of the inner disk. Thus it will be seen any movement of the disks will give a corresponding movement to the spindle 24 and the spreader or agitator 26 carried thereby.

Depending from the seed box or hopper 16 and communicating with the valve-port 17 I show an extensible or telescoping grain-spout composed of the sections 29 and 30, the section 29 secured to the lower face of the box and the section 30 extensible thereon and fixed by means of a set-screw 31. The spout depends at an angle from the box, and the lower end of the section 30 is curved and flared, as shown at 32. This construction of spout will insure the grain or seed passing to the spout from the hopper, being scattered in a uniform and even manner over the ground. Providing a telescoping spout enables me to turn at any angle desired and permits me to make the drop of the grain or seed at suitable points above the ground.

I have shown a cover for the seedbox at 33, arranged to slide in and out between the cleats 34, which makes access to the interior of the box very easy.

Having thus fully described my invention, what I claim, and desire to secure by Letters Patent of the United States, is—

1. An attachment for disk harrows, comprising a seeding-hopper supported above one series of disks and arranged with devices for distributing seed or grain at the rear of and in a path left vacant by the action of the inner matching right and left hand disks of the series, and mechanism for actuating the seeding devices in the hopper, substantially as described.

2. In combination with a disk harrow having right and left hand disks, a seeding attachment supported above one series of disks and extending over the vacant space between the inner matching right and left hand disks, a valve in the seeding attachment and a spout having connection with said valve and extending down and at the rear of the disks and arranged to distribute grain or seed over a vacant ridge left by the opposite action of the matching disks, and mechanism for actuating the seeder, substantially as described.

3. A seeding attachment for machines of the character described, comprising a hopper supported at the inner end and above one series of disks, a false bottom arranged in the hopper, a valve-port and a sliding valve above the port and agitating mechanism arranged above the valve and port, and means for actuating the agitator and adjusting mechanism for the valve, and a grain-spout shiftable to suitable angles arranged to drop grain or seed in a path left vacant by the action of the inner right and left hand disks of the series, substantially as described.

4. An attachment for disk harrows arranged to distribute grain or seed at the rear of and in the path of travel between the inner matching right and left disks, comprising the seedbox 16, having valve-opening and a sliding valve-plate with a corresponding opening, means of regulating the valve-plate, a false bottom 23, an agitator journaled on a suitable spindle and rotatable above the valve, and a telescoping grain-spout composed of the sections 29 and 30 having connection with the valve and arranged in a path at the rear of and between the inner matching right and left disks, substantially as described.

In witness whereof I sign my name in presence of two witnesses.

WILLIAM H. SMITH.

Witnesses:
CHAS. W. LA PORTE,
C. L. SMITH.